United States Patent [19]
Pierson

[11] Patent Number: 5,086,963
[45] Date of Patent: Feb. 11, 1992

[54] WEB GUIDANCE AND TRACKING MECHANISM FOR A CONTINUOUS BELT FILTER

[75] Inventor: Henri G. W. Pierson, Canary Island, Spain

[73] Assignee: D & C Limited, Monrovia, Liberia

[21] Appl. No.: 460,556

[22] Filed: Jan. 3, 1990

[30] Foreign Application Priority Data

Jan. 6, 1989 [GB] United Kingdom ............... 8900285

[51] Int. Cl.$^5$ ............................................. B65H 23/02
[52] U.S. Cl. ............................................... 226/17
[58] Field of Search ........................ 226/15, 17, 20, 3

[56] References Cited

U.S. PATENT DOCUMENTS

| | | | |
|---|---|---|---|
| 2,947,057 | 8/1960 | Meagher, Jr. et al. | 226/17 X |
| 3,323,700 | 6/1967 | Epstein et al. | 226/17 |
| 3,368,726 | 2/1968 | Funk et al. | 226/17 |
| 4,007,865 | 2/1977 | Crandall | 226/17 |
| 4,500,045 | 2/1985 | Whitaker et al. | 226/20 X |
| 4,567,492 | 1/1986 | Skrafvenstedt et al. | 226/17 X |

Primary Examiner—Daniel P. Stodola
Assistant Examiner—P. Bowen
Attorney, Agent, or Firm—Dennison, Meserole, Pollack & Scheiner

[57] ABSTRACT

The invention provides an improved web guidance mechanism in which the location of a web is detected and any deviation from a desired path is corrected without causing damage to the web material, for example a filter cloth. The improved mechanism includes two tracker units 10 having a pair of rollers 12, 14 defining a nip for an edge margin of a web. The lower roller 14 is acted on by an inflatable actuator 28 in the form of bellows and operative to raise or lower the roller 14 with respect to the upper roller 12. This is achieved by pivotally mounting a bracket 16, which carries the roller 14, and attaching thereto a bar 24 which rests via a contact plate 26 on the actuator 28. The actuator 28 is controlled by a sensor positioned adjacent to an edge of the web and operative to detect the presence or absence of the edge of the web on its desired path. In a preferred embodiment the sensor controls a pneumatic valve operable to inflate or deflate the actuator 28.

5 Claims, 2 Drawing Sheets

WEB GUIDANCE AND TRACKING MECHANISM
FOR A CONTINUOUS BELT FILTER

BACKGROUND OF THE INVENTION

This invention relates to a web guidance mechanism particularly for the guidance of a web of filter cloth material in a continuous belt filter.

In known continuous filter equipment the filter medium is usually an endless belt made of a porous cloth material arranged around end pulleys as in a belt filter or partially around a suction drum as in a rotary vacuum belt filter. These belts of filter material have to be guided or tracked to ensure that they run centrally of the equipment and do not foul or otherwise inhibit the correct operation of the machinery. Such tracking is also essential to ensure that the cloth material itself is not damaged during use.

A common known method of providing such tracking is to use two sets of nip rollers which are disposed at an angle of approximately 10° to the travel of the belt. The nip rollers may be normally open or engaged and cloth sensors are provided on each side of the cloth so that movement of an edge of the cloth with respect to its normal path may be detected. In the case of normally open rollers a sensor would be activated by the edge of the cloth moving towards it causing the nip rollers to be closed on the opposite side of the material thus pulling the web back with respect to the activated sensor and thus ensuring normal tracking. In a system where the nip rollers would be normally closed activation of one or more sensors would open the rollers thus allowing the cloth web to move in a reverse manner to that previously described. In most of these systems the sensor and the nip rollers are mounted in one common unit. These web tracking or guidance mechanisms have been for the most part, developed from the textile industry where similar tracking and guidance control is required during rolling or other manufacturing operations. Such systems are optimised for a situation where the cloth web is only tracked once and hence any slight amount of damage done to the edge of the cloth by the nip rollers is of little consequence. In a continuous belt filter the filter cloth may run for many months before being renewed and consequently would have to pass many times, perhaps hundreds of thousands, through the nip rollers or other guidance mechanisms. Any undue strain applied to the filter cloth by these mechanisms can therefore seriously weaken the cloth structure and lead to damage and/or uncertain filtration characteristics.

Furthermore, most known filter cloths tend to stretch during usage to the extent that the width of the cloth narrows slightly. In this instance the sensors would have to be repositioned at frequent intervals to allow for this. If such repositioning is not performed excessive movement of the cloth results which would require an excessive force on the part of the mechanism to ensure that the cloth is pulled back to its correct track. If too much displacement of the web occurs the tracking mechanism may not be able to pull the cloth back to its central position Furthermore, if the sensor and nip rollers are in one unit the repositioning of the sensors also requires repositioning of the nip rollers with the possibility that the nip angle (usually 10° as mentioned previously) would be altered during the positioning process. One further problem associated with the peculiar characteristics of filter cloths is the tendency to form wrinkles or folds. In order to prevent this it is advisable to ensure that the cloth is at all times under a slight tension especially prior to passing under the turning roller or rollers.

SUMMARY OF THE INVENTION

It is an object of the present invention therefore to provide a web guidance mechanism which is operative to detect the location of a web and its deviation from its desired path and to correct same without damaging the web material and which is in particular adapted to the characteristics of a filter cloth.

With this object in view the present invention provides a web guidance mechanism comprising a single sensor for location at or adjacent to the desired path for one edge of the web and operative to detect the presence or absence of the edge of the web on that desired path, and two tracker units arranged at opposing sides of the web path, each tracker unit comprising a pair of rollers defining a nip for passage therethrough of the respective edge margin of the web and an actuator which serves to adjust the position of one roller relative to the other, thereby opening or closing the associated nip, the single sensor being operatively connected to each of the tracker units so as to act selectively upon either the one or the other actuator, depending on whether the presence or absence of the web is detected, to close the nip of its associated roller pair thereby to grip the relevant edge margin of the web and cause the web to shift towards that side.

Preferably each actuator comprises an inflatable element which acts upon one of the rollers of each pair. A further aspect of the invention is a web guidance mechanism comprising sensor means positioned to detect the presence or absence of one or both edges of the web, and two tracker units arranged at opposing sides of the web, each tracker unit comprising a pair of rollers defining a nip for passage therethrough of the respective edge margin of the web and an actuator which serves to adjust the position of one roller relative to the other, thereby opening or closing the associated nip, the sensor means being operatively connected to the tracker units so as to act selectively upon the one or the other actuator to close the nip of its associated roller pair thereby to grip the relevant edge margin of the web and cause the web to shift towards that side, characterised in that the actuators each comprise an inflatable element.

Advantageously the sensor means are connected to the tracker units by way of switching means.

Preferably the sensor means are mounted remote from the tracker units and advantageously at or adjacent a portion of the desired path where the web is substantially vertical.

Advantageously the inflatable elements are connected to a compressed gas supply.

BRIEF DESCRIPTION OF THE DRAWINGS

The invention will be described further, by way of example, with reference to the accompanying drawings in which.

DESCRIPTION OF PREFERRED EMBODIMENTS

Figure 1:
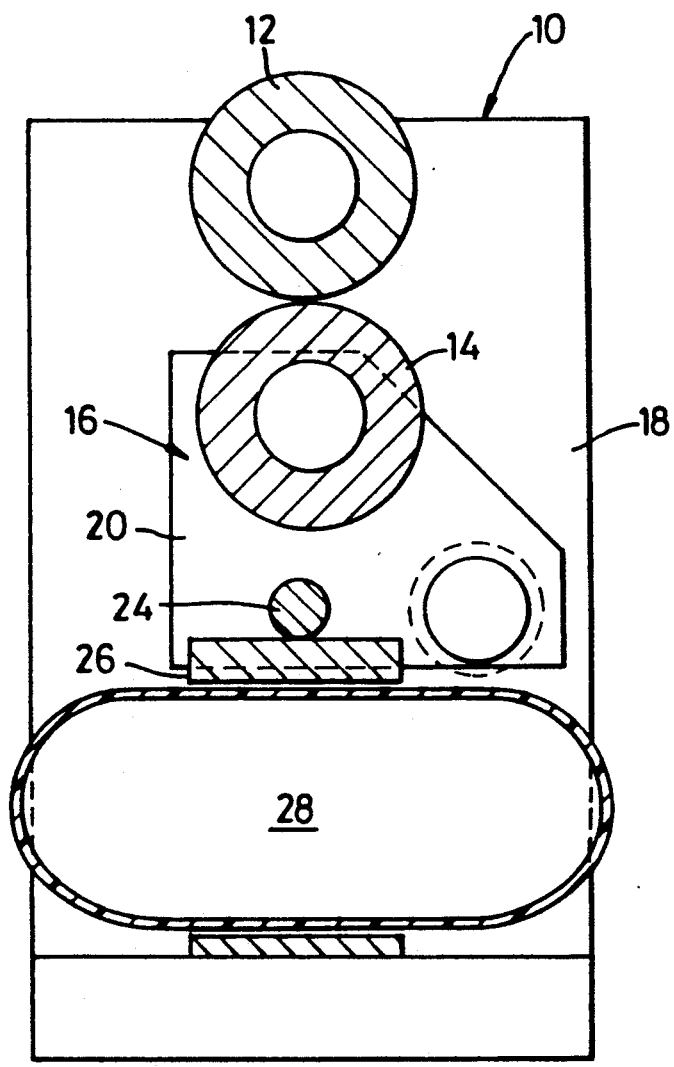
FIG. 1 is a sectional side elevation of a preferred embodiment of the invention.

Referring firstly to FIG. 1, which illustrates one tracker unit and associated actuator according to an aspect of the invention, one tracking unit 10 comprises an upper roller 12 and a lower roller 14 journalled such that the rollers 12, 14 lie respectively parallel to one another. The lower roller 14 is journalled in a bracket 16 such that it is displaceable with respect to the upper roller 12.

The bracket 16 is itself pivotally connected to a support frame which also serves to support the upper roller 12. The bracket 16 is formed of two end plates 20 between which is provided a shaft or bar 24 disposed substantially parallel to the upper and lower rollers 12, 14 respective axes of rotation Attached to the bar 24 is a contact plate 26 which rests on an inflatable actuator 28 in the form on inflatable bellow. The bellow is preferably of rubber, PTFE, nylon or any other material which is resistant to the affects of corrosion or dirt. The bellow may be in the form of a "balloon" or preferably is provided with concertina-like sides to effect the expansion of its upper surface. The bellows are furthermore preferably of a large diameter and large volume, for example, 150mm diameter with a height of 80mm.

To ensure an accurate raising of the lower roller 14 the actuator 28 should be centrally located with respect to the roller 14. The actuator should also underlie as large percentage of the roller's length as possible so that the movement of the roller 14 will be substantially at right angles to the upper roller's axis of rotation. Inflation of the actuator 28 is caused by the injection of a pressurised media, for example a gas or a liquid into the actuator 28. Expansion of the actuator causes the contact plate 26 to be raised with a corresponding movement of the bracket 16 and lower roller 14 with respect to the upper roller 12.

With such a configuration the rollers 12, 14 comprising the tracking units 10 can be moved towards one another using only a very low pressure inflation media and the speed of actuation can be accurately controlled. This is distinct from the action of the typical textile machinery tracking units which is very rapid and damaging to the fabric material. Although the bellow described is most suitable for use with air as the inflating media other gases or liquids could also be used.

Figure 2:
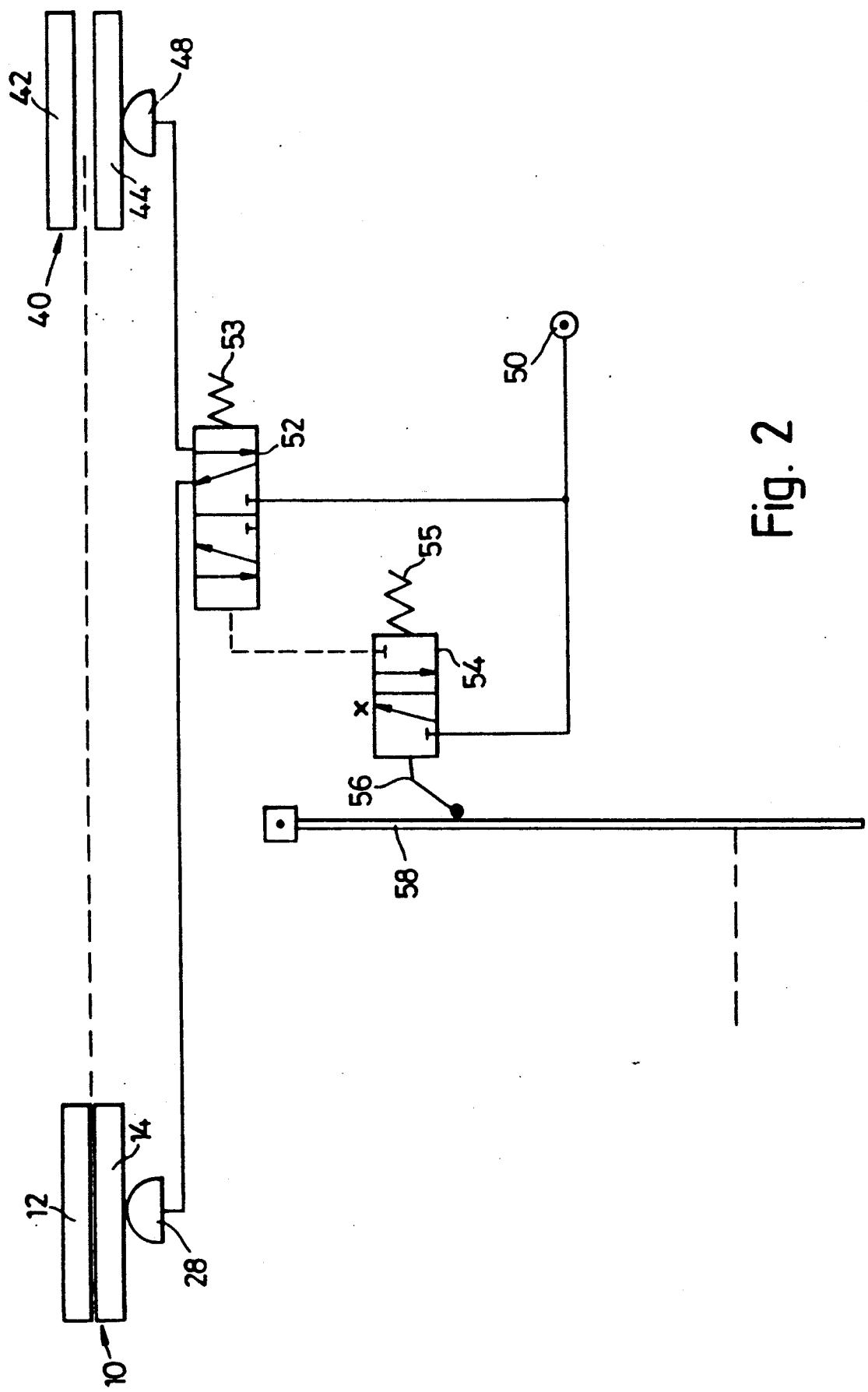
FIG. 2 is a diagrammatic end view of tracking units and control means according to the invention.

The method of actuation of the bellow 28 will be more readily understood with reference to FIG. 2 which illustrates in diagrammatic form a web guidance mechanism according to the invention. In FIG. 2 two tracking units 10, 40 are depicted each having an upper roller 12, 42 a d a lower roller 14, 44. The roller pairs of each unit 10, 40 are each journalled as depicted in FIG. 1. Associated with each tracking unit 10, 40 are actuators 28, 48 in the form of bellows attached to a source of compressed air 50 via a control valve 52.

Operation of the control valve 52 is controlled by a five ported actuation valve 54 which is connected via a trip switch 56 to a cloth sensor 58. The cloth sennsor 58 is mounted so as to sense one edge a web of material indicated by a broken line passing thereby. In a continuous belt filter machine the cloth sensor 58 is preferably mounted at a point where the filter cloth is substantially vertical as a vertical run offers a more stable edge to the cloth sensor 58. This is because the distance between turning rollers for reversing the direction of travel of the cloth is relatively small and hence the edge presented to the sensor at this point is relatively stable.

Operation of the trip switch 56 by the sensor 58 causes the actuation valve 54 to be displaced. This displacement causes a control signal to be passed to one control valve 52 which is operated so as to direct air from the supply 50 into one or other of the bellows 28 48. The direction of movement of the cloth in relation to the sensor 58 determines the direction of displacement of the actuation valve 54 and the correspondingly generated control signal determines which of the bellows 28, 48 are inflated to close the respective roller pairs 10, 40 and nip the filter cloth travelling therebetween. Both the control valve 52 and the actuation valve 54 are provided with spring return mechanisms 53, 55 operative to return the respective valve 52, 54 to its original position.

It will be appreciated that the cloth sensor 58 will be actuated by either the presence or absence of a cloth edge running against it and thus the movement of the trip switch 56 and control of the actuation valve 54 is such that almost no wandering of the filter cloth can occur during operation. If the filter cloth stretches during use one edge would still continue to run against the cloth sensor 58 and whereas this will cause the cloth to travel slightly off the centre of the desired path it ensures that at no time can both edges of the cloth be displaced so as to permit the cloth to wander towards the drive rollers and the sharp machine parts associated therewith which would cause damage to the cloth.

A further advantage of the invention is that the pressure in one or other of the bellows 28, 48 can be released relatively slowly whilst the pressure in the other bellow 28, 48 may be increased at the same or a similar rate. In this way a gradual change from closing of one roller pair 10, 40 to closing of the other roller pair can be made whilst ensuring that a gentle pull is maintained across the cloth width to prevent wrinkles or folding which would be detrimental to the operating characteristics of the filtration apparatus.

It will also be appreciated that whilst the preferred embodiment operates using a pneumatic or compressed air control apparatus the same principle can be applied using electrical signals, light signals or hydraulic equipment for control or actual inflation of the bellows 28, 48.

A modified embodiment of the invention provides an additional cloth sensor which would be mounted so as to contact the second edge of the web in opposition to the first such sensor. In this arrangement each sensor would be operatively connected to that roller pair effective to engage the opposed edge so as to pull the web away from the actuated sensor. In such an arrangement the control valve 52 would be considerably simplified and could be replaced by a simple on/off valve and a venting arrangement to permit release of the pressurised media and consequent deflation of the actuator. The actuators in this arrangement could be supplied from a common pressurised media source or could each have an independent source. Operation of the actuation valve 54 would be similar to that of the illustrated embodiment in that it would be required to sense the presence or absence of an associated edge so as to inflate or deflate the actuator as required. It will be understood that the foregoing is illustrative of the invention and not restrictive thereof and variations may be made thereto. For example, additional cloth sensors could be provided to ensure that the tracking of the cloth is more rigidly defined within a specific desired path. The actuation and control valves may be of any desired type according to the manner of operation of the control apparatus and the method of inflation of the bellows 28, 48. Several roller pairs may be positioned at appropriate points along the desired travel path of a cloth and may be controlled independently or by a single sensor. The sensor need not be applied to a vertical run but may be mounted against a horizontal run if that is more convenient. Although the invention is particularly applicable to continuous belt filtration apparatus its unique advantages may also be utilised in textile machinery for ensuring correct tracking of cloth which is easily damaged or where accurate tracking is required during the rolling process. The control and actuation valves are preferably standard pneumatic valves as are generally known and available.

I claim:

1. A web guidance mechanism comprising
a first tracker unit arranged at one side of a web path and comprising a first pair of rollers defining a nip for passage therethrough of a first respective edge margin of a web and a first actuator which serves to adjust the position of one roller of the first pair of rollers relative to the other thereby opening or closing the associated nip,
a second tracker unit arranged at one side of said web path in opposition to said first tracker unit and comprising a second pair of rollers defining a nip for passage therethrough of a second respective edge margin of said web and a second actuator which serves to adjust the position of one roller of the second pair of rollers, relative to the other thereby opening or closing the associated nip,
sensor means located at or adjacent to a desired path for at least one edge of said web for detecting the presence or absence of said edge on said desired path, said sensor means being connected through control means too said first and second tracker units such that the control means is operative to cause alternate operation of one or the other of the first or second actuator in response to the presence or absence of said web edge, to open the nip of one roller pair and to at substantially the same time close the nip of the other roller pair thereby to grip a respective edge margin of said web, tension said web and cause the web to shift towards said closed roller pair, only one of said roller pairs being effectively engaged with said web at one time.

2. A guidance mechanism as claimed in claim 1 in which said first and said second actuators each comprise an inflatable bellows which acts upon one of aid rollers of the associated pair and means for inflating said bellows.

3. A guidance mechanism as claimed in claim 1 in which said first and second actuators each comprise an inflatable element, means for inflating said element, each of said first and second pairs of rollers including an upper roller and a lower roller, a contact plate overlying each element, a bracket connected to each contact plate and carrying the lower roller of an associated pair of rollers for displacement of the lower roller relative to the associated upper roller by movement of the corresponding contact plate in response to selective inflation and deflation of the corresponding inflatable element.

4. A guidance mechanism as claimed in claim 1 wherein said sensor means comprises a first sensor positioned to detect the presence or absence of a first edge of said web on a desired web path, and a second sensor positioned to detect the presence or absence of a second edge of said web on a desired web path.

5. A guidance mechanism as claimed in claim 1 in which said sensor is mounted at or adjacent that portion of said desired path in which said web is substantially vertical.

* * * * *

UNITED STATES PATENT AND TRADEMARK OFFICE
CERTIFICATE OF CORRECTION

PATENT NO. : 5,086,963
DATED : February 11, 1992
INVENTOR(S) : Henri G. W. Pierson It is certified that error appears in the above-identified patent and that said Letters Patent is hereby corrected as shown below:

Column 6, line 1, "too" should be --to--.

Column 6, line 14, "aid" should be --said--.

Signed and Sealed this

Thirteenth Day of April, 1993

*Attest:*

STEPHEN G. KUNIN

*Attesting Officer*         *Acting Commissioner of Patents and Trademarks*